United States Patent [19]
Sato

[11] Patent Number: 6,072,554
[45] Date of Patent: Jun. 6, 2000

[54] IN-PLANE SWITCHING TYPE LIQUID CRYSTAL DISPLAY WHEREIN THE UPPER SURFACE OF THE FIRST SUBSTATE HAVING A RAISED PORTION

[75] Inventor: Nolifumi Sato, Tokyo, Japan

[73] Assignee: NEC Corporation, Tokyo, Japan

[21] Appl. No.: 09/394,343

[22] Filed: Sep. 13, 1999

Related U.S. Application Data

[62] Division of application No. 09/217,057, Dec. 21, 1998.

[30] Foreign Application Priority Data

Dec. 25, 1997 [JP] Japan ................................. 9-356527

[51] Int. Cl.[7] .................................................. G02F 1/1343
[52] U.S. Cl. ......................... 349/141; 349/138; 349/158; 349/143
[58] Field of Search .................................. 345/141, 143, 345/123, 138, 158

[56] References Cited

U.S. PATENT DOCUMENTS

| | | | |
|---|---|---|---|
| 5,399,390 | 3/1995 | Akins | 349/158 |
| 5,514,850 | 5/1996 | Miyazaki et al. | 349/158 |
| 5,572,345 | 11/1996 | Yamazaki et al. | 349/158 |
| 5,907,379 | 9/1999 | Kim et al. | 349/141 |
| 5,914,761 | 6/1999 | Ohe et al. | 349/141 |
| 5,979,708 | 9/1999 | Kim et al. | 349/141 |
| 5,986,735 | 11/1999 | Komatsu | 349/128 |

FOREIGN PATENT DOCUMENTS

| | | |
|---|---|---|
| 7-128683 | 5/1995 | Japan . |
| 7-159786 | 6/1995 | Japan . |
| 8-220518 | 8/1996 | Japan . |

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

There is provided a liquid crystal display including (a) a first substrate, (b) a second substrate spaced away from and facing the first substrate, (c) a liquid crystal layer sandwiched between the first and second substrates, (d) a first electrode formed on the first substrate at a surface facing the liquid crystal layer, (e) a second electrode formed on the first substrate at a surface facing the liquid crystal layer, and cooperating with the first electrode to form a pixel, the first and second electrodes generating an electric field therebetween to thereby implement in-plane switching, and (f) an interlayer insulating film formed at least below the second electrode, but not formed at least below the first electrode, a dielectric layer formed between at least a part of an upper surface of the first electrode and the liquid crystal layer being designed to have a capacitance per a unit area, almost equal to a capacitance per a unit area of a dielectric layer formed between at least a part of an upper surface and the liquid crystal layer. In the abovementioned liquid crystal display, since a dielectric distance between the first electrode and the liquid crystal layer is almost equal to a dielectric distance between the second electrode and the liquid crystal layer, it is possible to balance flexo-electric effects on the first and second electrodes, which ensures suppression in generation of after-images.

9 Claims, 17 Drawing Sheets

IN-PLANE SWITCHING TYPE LIQUID CRYSTAL DISPLAY WHEREIN THE UPPER SURFACE OF THE FIRST SUBSTATE HAVING A RAISED PORTION

This is a divisional of application Ser. No. 09/217,057 filed Dec. 21, 1998, the disclosure of which is incorporated herein by reference.

BACKGROUND OF THE INVENTION

1. Field of the Invention

The invention relates to a liquid crystal display and a method of fabricating the same, and more particularly to a liquid crystal display implementing in-plane switching where an electric field to be applied to liquid crystal is generated in a plane parallel to a substrate, and a method of fabricating the same.

2. Description of the Related Art

A conventional liquid crystal display having employed twisted nematic is accompanied with a problem of a narrow viewing angle. In order to solve this problem, there has been suggested an in-plane switching (IPS) type liquid crystal display in which an electric field to be applied to liquid crystal is generated in a plane parallel to a substrate.

An in-plane switching type liquid crystal display is suggested, for instance, in Japanese Unexamined Patent Publications Nos. 7-128683, 7-159786, and 8-220518.

FIG. 1 is a top plan view of an in-plane switching type liquid crystal display suggested in Japanese Unexamined Patent Publication No. 7-128683, FIG. 2 is a cross-sectional view taken along the line II—II in FIG. 1, and FIG. 3 is a cross-sectional view of the in-plane switching type liquid crystal display. Each of FIGS. 1 to 3 illustrates a pixel positioned at an intersection of an image signal line 861 nd a scanning line 862.

As illustrated in FIGS. 1 to 3, the illustrated liquid crystal display is comprised of a substrate 810, a first comb-shaped electrode 801 formed on the substrate 810 and composed of an electrically conductive layer made of metal and so on, an interlayer insulating layer 811 covering the first comb-shaped electrode 801 and the substrate 810 therewith, a second comb-shaped electrode 802 formed on the interlayer insulating layer 811 and composed of an electrically conductive layer made of metal and so on, an alignment layer 820 formed over the second comb-shaped electrode 802 and the interlayer insulating film 811 for aligning liquid crystal, an opposing substrate 840 formed with a color layer (not illustrated), black matrix (not illustrated) and so on, an alignment layer 821 formed on a lower surface of the opposing substrate 840 for aligning liquid crystal, a liquid crystal layer 830 sandwiched between the alignment layers 820 and 821, and a thin film transistor (TFT) 863 for driving liquid crystal.

As is understood in view of FIGS. 2 or 3, the first and second combshaped layers 801 and 802 are electrically conductive layers formed in separate fabrication steps. The first and second comb-shaped layers 801 and 802 are separated from each other by the interlayer insulating film 811.

In operation, when the scanning line 862 is selected, a voltage on the image signal line 861 is transferred to the second comb-shaped electrode 802 through the thin film transistor 863. As a result, an electric field is generated between the first and second comb-shaped electrodes 801 and 802 in accordance with image data.

Liquid crystal molecules in the liquid crystal layer 830 are in advance aligned in a direction almost perpendicular to a plane of FIG. 3 by the alignment layers 820 and 821. These liquid crystal molecules are oriented in accordance with the electric field, as illustrated in FIG. 3. Thus, there is implemented inplane switching.

FIGS. 4 and 5 illustrate an in-plane switching type liquid crystal display suggested in the above-mentioned Japanese Unexamined Patent Publication No. 7-128683. FIG. 4 is a top plane view of the liquid crystal display, and FIG. 5 is a cross-sectional view taken along the line V—V in FIG. 4.

In the illustrated liquid crystal display, a common line 903 is electrically connected to a first comb-shaped electrode 901 through a contact hole 904. Hence, the first comb-shaped electrode 901 and a second comb-shaped electrode 902 are formed in a common electrically conductive layer on a substrate 910. When a scanning line 962 is selected, a voltage on an image signal line 961 is transferred to a second comb-shaped electrode 902 through a thin film transistor 963. As a result, there is generated an electric field between the first and second electrodes 901 and 902. The thus generated electric field performs in-plane switching.

In accordance with the liquid crystal display suggested in the abovementioned Publication, the first comb-shaped electrode 901 has the same height as that of the second comb-shaped electrode 902, as illustrated in FIG. 5, ensuring enhancement in degree of parallelization of an electric field performing in-plane switching.

The above-mentioned Japanese Unexamined Patent Publication No. 7-159786 has suggested a liquid crystal display in which an alignment layer and an insulating film are designed to have a smaller dielectric constant than that of a liquid crystal layer to thereby generate an improved horizontal electric field, an insulating film and an alignment layer are composed of common material to thereby improve an efficiency of fabrication process, and electric fields for in-plane switching are made parallel.

The above-mentioned Japanese Unexamined Patent Publication No. 8-220518 has suggested a liquid crystal display in which recessed and raised portions of a surface facing a liquid crystal layer are less formed to thereby ensure a higher contrast ratio.

However, with respect to display characteristics, an in-plane switching type liquid crystal display is accompanied with a problem of after-image, which is bound also in a twisted nematic type liquid crystal display, but in a smaller degree. The problem of after-image in an in-plane switching type liquid crystal display is pointed out also in the above-mentioned Japanese Unexamined Patent Publication No. 7-157986.

It is said that such after-image is caused by electric charges residual at an alignment layer and/or at an interface between a substrate and a liquid crystal layer. It is considered that after-image is not generated, if liquid crystal is driven by an alternative current between first and second comb-shaped electrodes, and an absolute value of a positive voltage is substantially equal to an absolute value of a negative voltage in an alternative current.

However, the inventor of the present invention has found that flexo-electric effect found on a comb-shaped electrode has a close connection with generation of after-image.

In general, if bar-shaped liquid crystal molecules are radially aligned or spray-aligned, there would be generated polarization between inside and outside of radial alignment configuration. This is called flexo-electric effect. A degree of flexo-electric effect is dependent on a degree of extension of radial alignment configuration.

In the conventional liquid crystal display illustrated in FIGS. 1 to 3, whereas the interlayer insulating film 811 and the alignment layer 820 are sandwiched between the first comb-shaped electrode 801 and the liquid crystal layer 830, only the alignment layer 820 is sandwiched between the second comb-shaped electrode 802 and the liquid crystal layer 830, as illustrated in FIG. 3.

In other words, a dielectric distance between an upper surface of the first comb-shaped electrode 801 and the liquid crystal layer 830 is different from a dielectric distance between an upper surface of the second comb-shaped electrode 802 and the liquid crystal layer 830 by a thickness of the interlayer insulating film 811. Herein, a dielectric distance is defined as a capacitance per a unit area, obtained when sandwiched between imaginary electrodes.

As a result, a degree of extension in radial configuration of alignment of liquid crystal in the vicinity of the alignment layer 820 just above the first comb-shaped electrode 801 is different from the same in the vicinity of the alignment layer 820 just above the second comb-shaped electrode 802. Liquid crystal generates flexo-electric effect in dependence of the radial configuration, and polarize. It is considered that if the radial configuration of liquid crystal above the first comb-shaped electrode 801 is identical with the radial configuration of liquid crystal above the second comb-shaped electrode 802, polarization of liquid crystal is balanced, and if electric charges are accumulated on the first and second comb-shaped electrodes 801 and 802 to the same degree, a voltage based on a direct current is not residual across the first and second comb-shaped electrodes 801 and 802, even after in-plane switching has been stopped, which will not contribute to generation of after-image.

However, if the radial configuration of liquid crystal above the first comb-shaped electrode 801 has an extension in a different degree from an extension of the radial configuration of liquid crystal above the second comb-shaped electrode 802, polarization of liquid crystal is not balanced. As a result, electric charges are residual in implementing in-plane switching, which would cause a problem of after-image.

In the liquid crystal display illustrated in FIGS. 4 and 5, the first and second comb-shaped electrodes 901 and 902 are formed with no interlayer insulating layer being formed therebetween, and hence, can be formed in a common film-forming step. However, as illustrated in FIG. 6, in a photolithography step for forming an electrically conductive layer from which the first and second comb-shaped electrodes 901 and 902 are formed, a patterning defect 970 might occur because of etching residue or inaccuracy in photolithography. If the patterning defect 970 as illustrated in FIG. 6 occurs, the first comb-shaped electrode 901 would be readily short-circuited with the second comb-shaped electrode 902.

That is, the liquid crystal display illustrated in FIGS. 4 and 5 can advantageously suppress generation of after-image, but is accompanied with a problem of reduction in a fabrication yield, as mentioned above.

SUMMARY OF THE INVENTION

It is an object of the present invention to provide a liquid crystal display and a method of fabricating the same, both of which are capable of suppressing generation of after-image caused by imbalance in flexo-electric effect originated from two comb-shaped electrodes, and enhancing a yield of fabricating liquid crystal display.

In one aspect of the present invention, there is provided a liquid crystal display including (a) a first substrate, (b) a second substrate spaced away from and facing the first substrate, (c) a liquid crystal layer sandwiched between the first and second substrates, (d) a first electrode formed on the first substrate at a surface facing the liquid crystal layer, (e) a second electrode formed on the first substrate at a surface facing the liquid crystal layer, and cooperating with the first electrode to form a pixel, the first and second electrodes generating an electric field therebetween to thereby implement in-plane switching, and (f) an interlayer insulating film formed at least below the second electrode, but not formed at least below the first electrode, a dielectric layer formed between at least a part of an upper surface of the first electrode and the liquid crystal layer being designed to have a capacitance per a unit area, almost equal to a capacitance per a unit area of a dielectric layer formed between at least a part of an upper surface and the liquid crystal layer.

It is preferable that the interlayer insulating film covers the first electrode therewith, and that the interlayer insulating film is designed to have a first thickness on an upper surface of the first electrode and a second thickness below the second electrode, the first thickness being smaller than the second thickness.

It is also preferable that the interlayer insulating film is designed to have a third thickness in a region other than a region located below the second electrode, the third thickness being smaller than the second thickness.

It is preferable that the interlayer insulating film is formed only in a region other than an upper surface of the first electrode.

The second electrode may be covered with an anodic oxide film.

It is preferable that the liquid crystal display may further include a cover insulating film covering the first and second electrodes therewith.

It is preferable that an upper surface of the first electrodes is exposed. It is also preferable that upper and side surfaces of the first electrode are exposed.

There is further provided a liquid crystal display including (a) a first substrate, (b) a second substrate spaced away from and facing the first substrate, (c) a liquid crystal layer sandwiched between the first and second substrates, (d) a first electrode formed on the first substrate at a surface facing the liquid crystal layer, (e) a second electrode formed on the first substrate at a surface facing the liquid crystal layer, and cooperating with the first electrode to form a pixel, the first and second electrodes generating an electric field therebetween to thereby implement in-plane switching, (f) an interlayer insulating film formed at least below the second electrode and over the first electrode, and (g) a flexo-electric relieving layer composed of electrically insulating material and formed on the second electrode, a dielectric layer formed between at least a part of an upper surface of the first electrode and the liquid crystal layer being designed to have a capacitance per a unit area, almost equal to a capacitance per a unit area of a dielectric layer formed between at least a part of an upper surface and the liquid crystal layer.

It is preferable that the flexo-electric relieving layer is almost coextensive with the second electrode.

It is also preferable that the flexo-electric relieving layer has the same thickness as a thickness of the interlayer insulating layer formed on the first electrode.

It is preferable that the flexo-electric relieving layer has a ratio of a thickness to a dielectric constant, which ratio is almost equal to a ratio of a thickness to a dielectric constant, of the interlayer insulating layer.

There is still further provided a liquid crystal display including (a) a first substrate formed at an upper surface thereof with at least one recessed portion, (b) a second substrate spaced away from and facing the first substrate, (c) a liquid crystal layer sandwiched between the first and second substrates, (d) a first electrode formed on the first substrate at a surface facing the liquid crystal layer, (e) a second electrode formed on the first substrate at a surface facing the liquid crystal layer, and cooperating with the first electrode to form a pixel, the first and second electrodes generating an electric field therebetween to thereby implement in-plane switching, at least a part of the second electrode being formed in the recessed portion of the first electrode, and (f) an interlayer insulating film formed at least below the second electrode, but not formed at least below the first electrode, a dielectric layer formed between at least a part of an upper surface of the first electrode and the liquid crystal layer being designed to have a capacitance per a unit area, almost equal to a capacitance per a unit area of a dielectric layer formed between at least a part of an upper surface and the liquid crystal layer.

The liquid crystal display may further include an insulating film formed on the first substrate, in which case, the recessed portion is formed at a surface of the insulating film.

It is preferable that the liquid crystal display may further include a flat insulating film covering the first and second electrodes.

For instance, the flat insulating film may be formed by applying onto the first and second electrodes and baking. The flat insulating film may be composed predominantly of organic polymer.

The flat insulating film may be used as an alignment layer.

The liquid crystal display may further include a flexo-electric relieving layer composed of electrically insulating material and formed on the second electrode.

There is yet further provided a liquid crystal display including (a) a first substrate formed at an upper surface thereof with at least one raised portion, (b) a second substrate spaced away from and facing the first substrate, (c) a liquid crystal layer sandwiched between the first and second substrates, (d) a first electrode formed on the first substrate at a surface facing the liquid crystal layer, at least a part of the first electrode being formed on the raised portion, (e) a second electrode formed on the first substrate at a surface facing the liquid crystal layer, and cooperating with the first electrode to form a pixel, the first and second electrodes generating an electric field therebetween to thereby implement inplane switching, and (f) an interlayer insulating film formed at least below the second electrode, but not formed at least below the first electrode, a dielectric layer formed between at least a part of an upper surface of the first electrode and the liquid crystal layer being designed to have a capacitance per a unit area, almost equal to a capacitance per a unit area of a dielectric layer formed between at least a part of an upper surface and the liquid crystal layer.

The liquid crystal may further include an insulating film formed on the first substrate, in which case, the recessed portion is formed at a surface of the insulating film.

The liquid crystal display may further include a flexo-electric relieving layer composed of electrically insulating material and formed on the second electrode.

In another aspect of the present invention, there is provided a method of fabricating a liquid crystal display including (a) a first substrate, (b) a second substrate spaced away from and facing the first substrate, (c) a liquid crystal layer sandwiched between the first and second substrates, (d) a first electrode formed on the first substrate at a surface facing the liquid crystal layer, and (e) a second electrode formed on the first substrate at a surface facing the liquid crystal layer, and cooperating with the first electrode to form a pixel, the first and second electrodes generating an electric field therebetween to thereby implement inplane switching, the method including the steps, in sequence, of (a) forming a first metal layer on the first substrate, (b) patterning the first metal layer into a first electrode, (c) covering the first electrode with an interlayer insulating layer, (d) forming a second metal layer on the interlayer insulating layer, (e) forming an insulating layer on the second metal layer, and (f) patterning the second metal layer and the insulating layer into the second electrode and a flexo-electric relieving layer almost coextensive with the second electrode.

The liquid crystal display may further include an insulating film formed on the first substrate, in which case, the first metal layer is formed on the insulating film.

There is further provided a method of fabricating a liquid crystal display including (a) a first substrate, (b) a second substrate spaced away from and facing the first substrate, (c) a liquid crystal layer sandwiched between the first and second substrates, (d) a first electrode formed on the first substrate at a surface facing the liquid crystal layer, and (e) a second electrode formed on the first substrate at a surface facing the liquid crystal layer, and cooperating with the first electrode to form a pixel, the first and second electrodes generating an electric field therebetween to thereby implement in-plane switching, the method including the steps, in sequence, of (a) forming a first metal layer on the first substrate, (b) patterning the first metal layer into a first electrode, (c) covering the first electrode with an interlayer insulating layer, (d) forming a second metal layer on the interlayer insulating layer, and (e) etching both the second metal layer and the interlayer insulating layer to thereby pattern both the second metal layer and the interlayer insulating layer into the second electrode, and thin or remove the interlayer insulating layer in a region other than a region located below the second electrode.

There is still further provided a method of fabricating a liquid crystal display including (a) a first substrate, (b) a second substrate spaced away from and facing the first substrate, (c) a liquid crystal layer sandwiched between the first and second substrates, (d) a first electrode formed on the first substrate at a surface facing the liquid crystal layer, and (e) a second electrode formed on the first substrate at a surface facing the liquid crystal layer, and cooperating with the first electrode to form a pixel, the first and second electrodes generating an electric field therebetween to thereby implement in-plane switching, the method including the steps, in sequence, of (a) forming a recessed portion at a surface of the first substrate, (b) forming a first metal layer on the first substrate, (c) patterning the first metal layer into a first electrode on a surface of the first electrode, (d) covering the first electrode with an interlayer insulating layer, (e) forming a second metal layer on the interlayer insulating layer, and (f) patterning the second metal layer into the second electrode in the recessed portion of the first substrate.

There is yet further provided a method of fabricating a liquid crystal display including (a) a first substrate, (b) a second substrate spaced away from and facing the first substrate, (c) a liquid crystal layer sandwiched between the first and second substrates, (d) a first electrode formed on the first substrate at a surface facing the liquid crystal layer, and (e) a second electrode formed on the first substrate at a surface facing the liquid crystal layer, and cooperating with the first electrode to form a pixel, the first and second electrodes generating an electric field therebetween to thereby implement in-plane switching, the method including the steps, in sequence, of (a) forming a raised portion at a surface of the first substrate, (b) forming a first metal layer on the raised portion of the first substrate, (c) patterning the first metal layer into a first electrode, (d) covering the first electrode with an interlayer insulating layer, (e) forming a second metal layer on the interlayer insulating layer, and (f) patterning the second metal layer into the second electrode above a region other than a region where the raised portion is formed.

In accordance with the above-mentioned liquid crystal display, a dielectric distance between the first electrode and the liquid crystal layer is designed to be almost equal to a dielectric distance between the second electrode and the liquid crystal layer. Hence, it is possible to keep flexo-electric effects on the first and second electrodes balanced, which ensures suppression in generation of after-image.

Since the interlayer insulating film electrically insulates the first and second electrodes from each other, it is possible to avoid the first and second electrodes from being short-circuited due to a patterning defect, ensuring a higher fabrication yield.

In accordance with the above-mentioned methods, it is possible to fabricate the above-mentioned liquid crystal display. In addition, since the second electrode and the flexo-electric relieving layer are formed in a common step, or since the second electrode is formed in a step in which the interlayer insulating film is also thinned or removed, it is possible to shorten a process of fabricating a liquid crystal display.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

Figure 1:
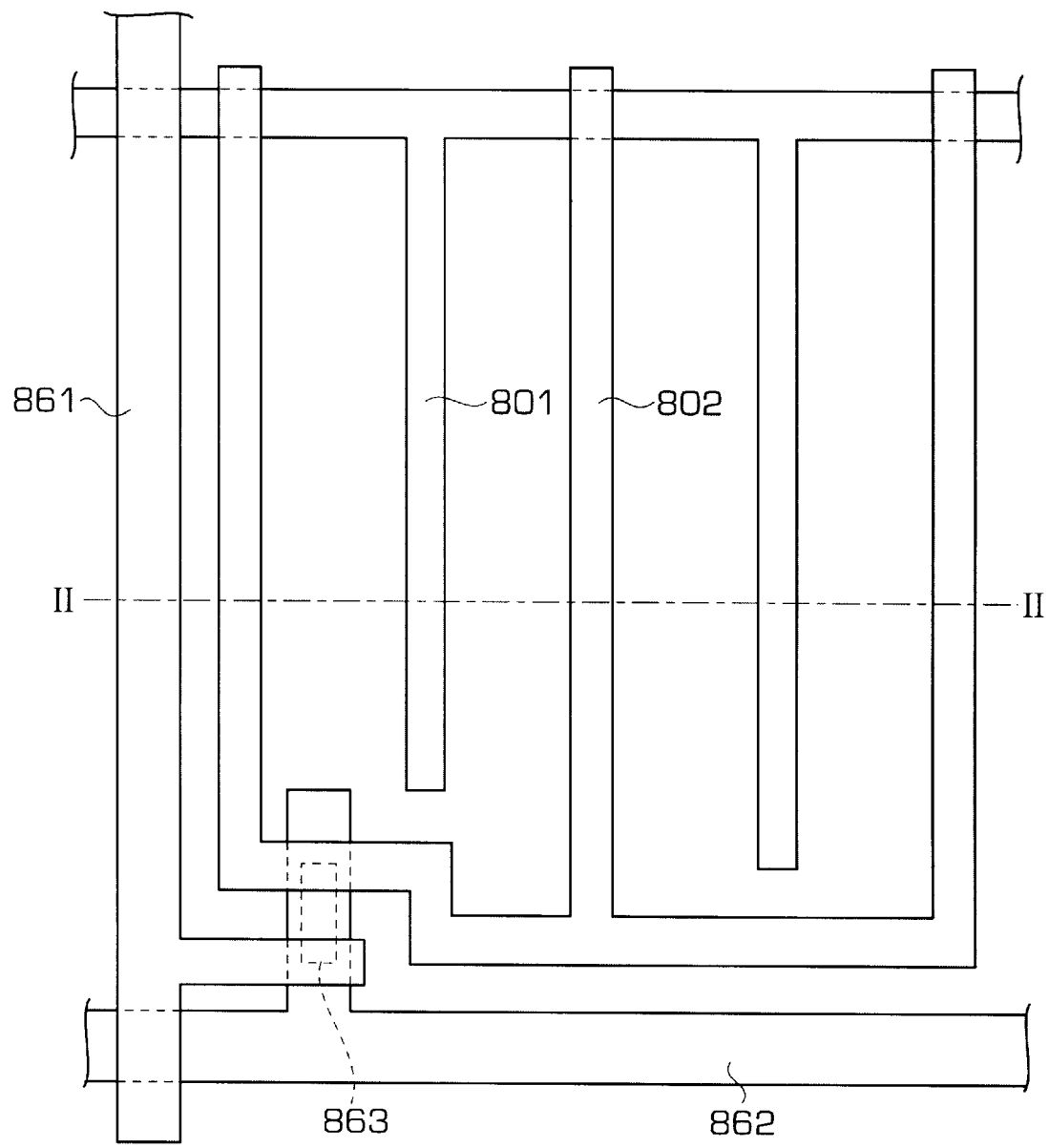
FIG. 1 is a top plan view of a pixel in a first conventional liquid crystal display.
Figure 2:
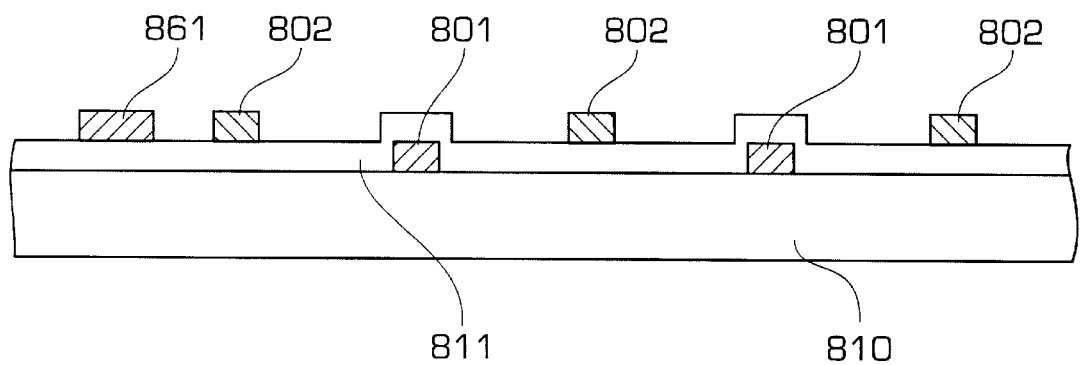
FIG. 2 is a cross-sectional view taken along the line II—II in FIG. 1.
Figure 3:
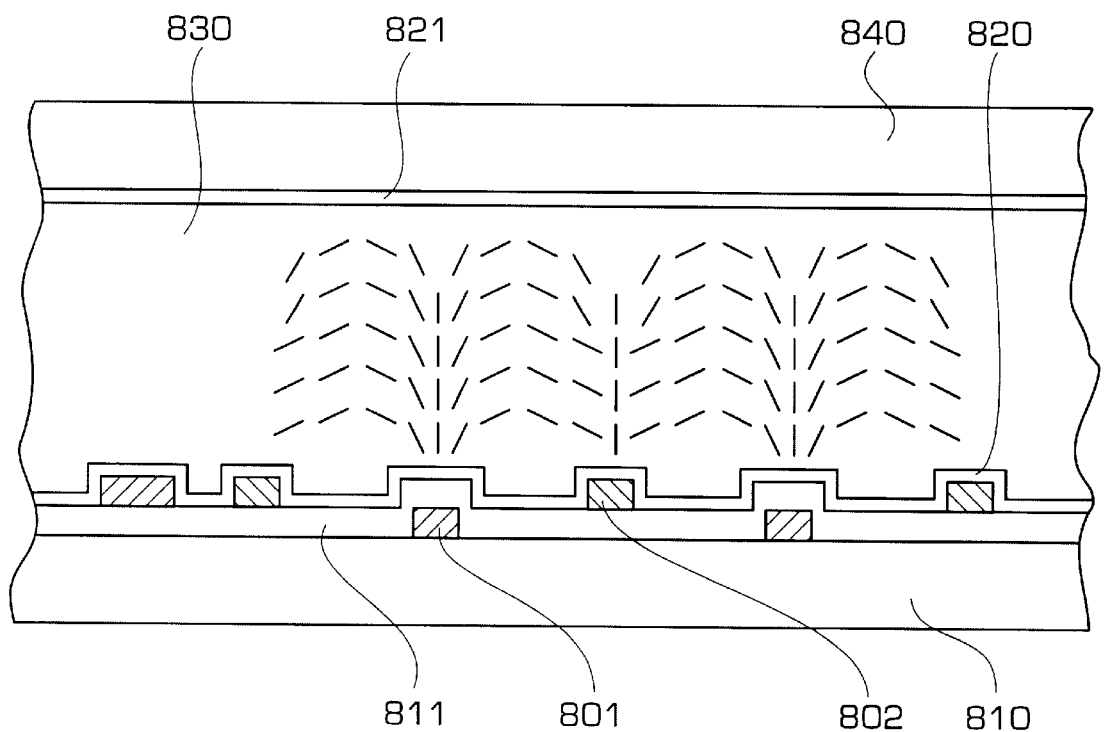
FIG. 3 is a cross-sectional view of the first conventional liquid crystal display.
Figure 4:
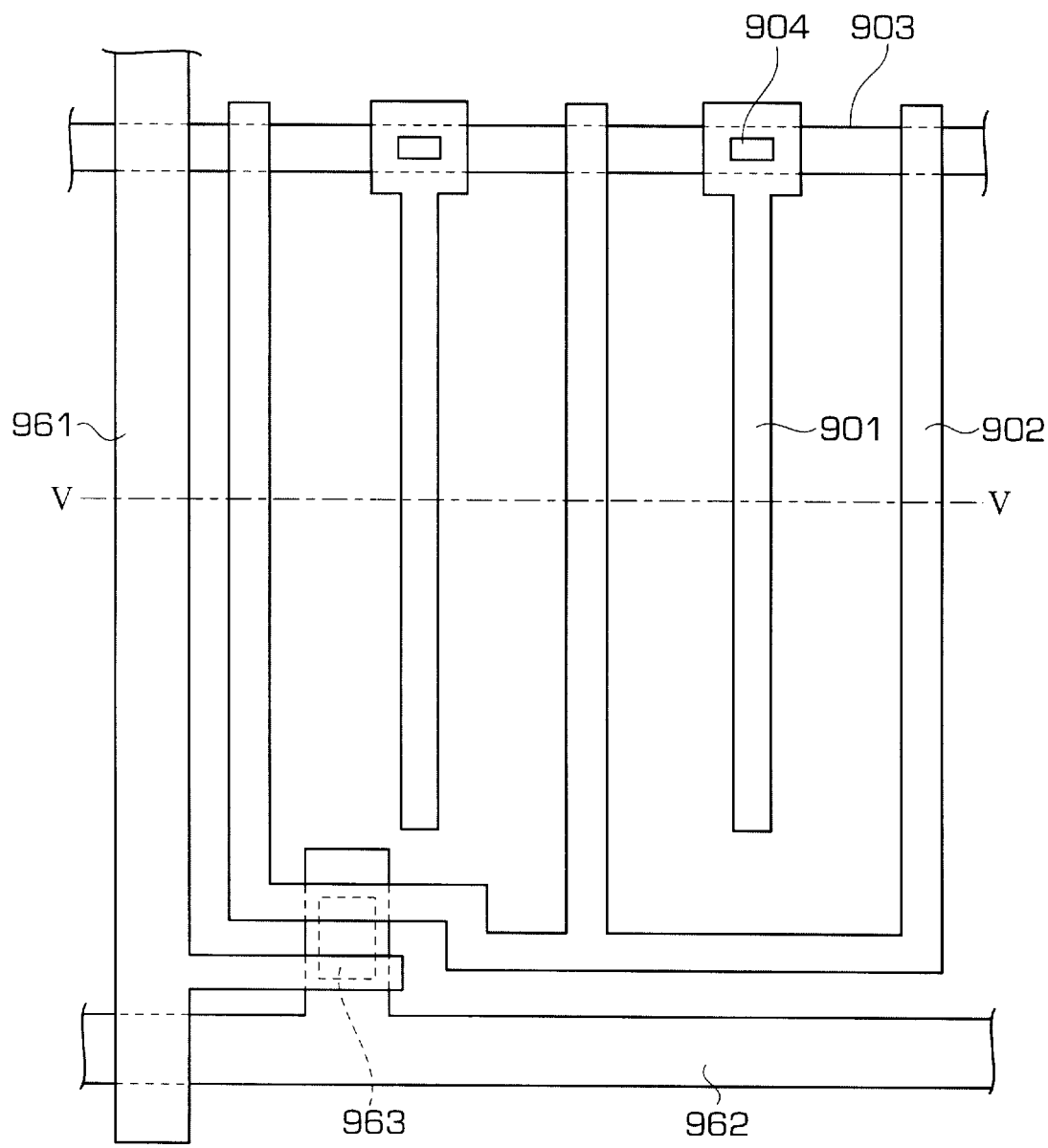
FIG. 4 is a top plan view of a pixel in a second conventional liquid crystal display.
Figure 5:
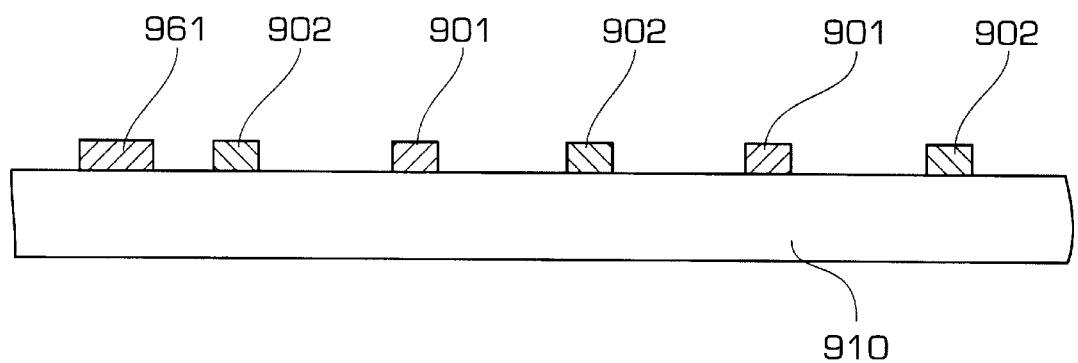
FIG. 5 is a cross-sectional view taken along the line V—V in FIG. 4.
Figure 6:
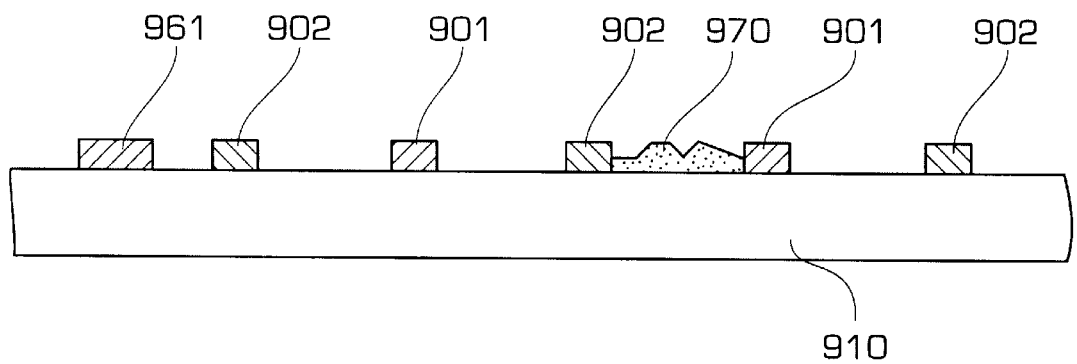
FIG. 6 is a cross-sectional view of the second conventional liquid crystal display.
Figure 7:
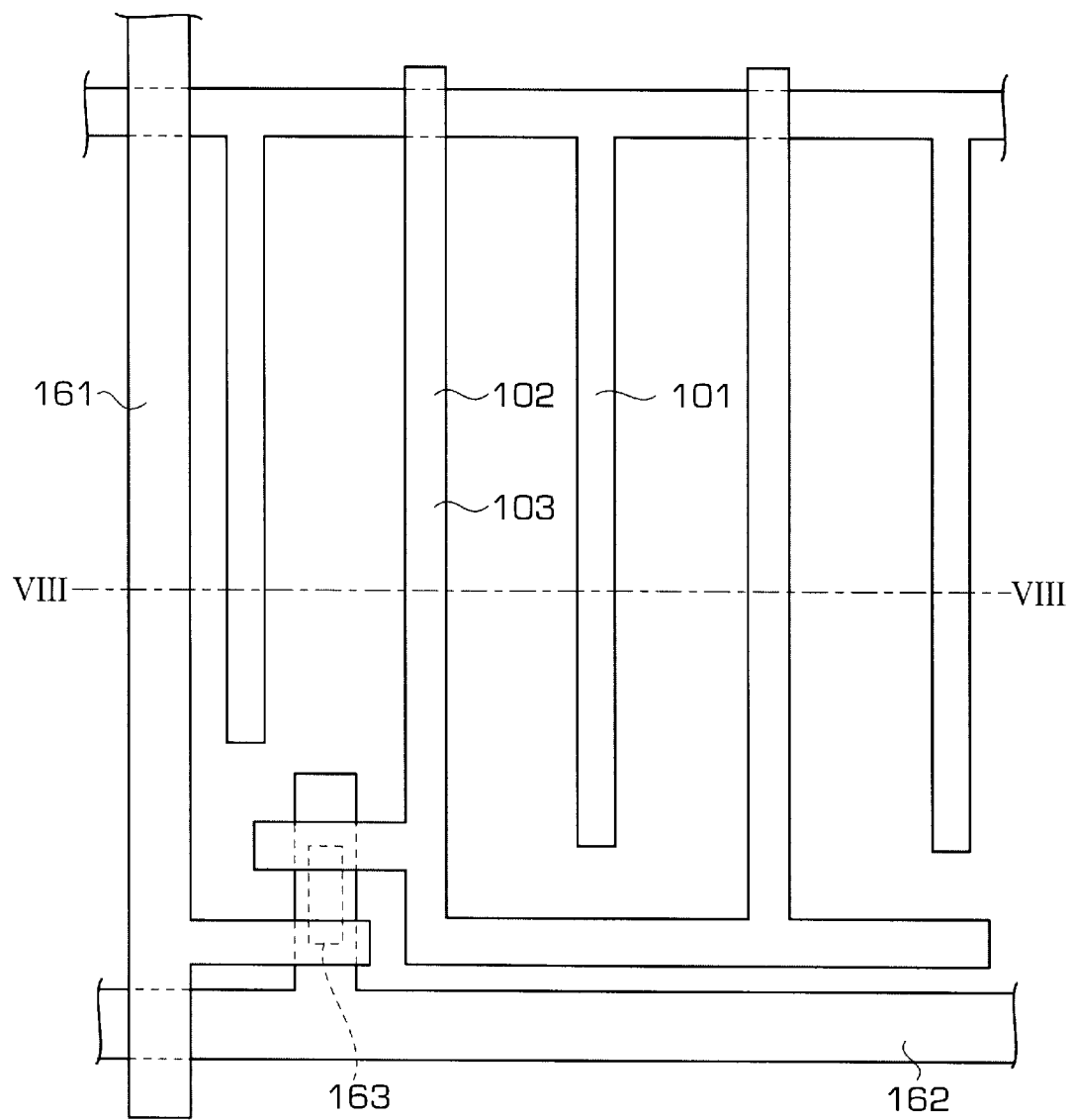
FIG. 7 is a top plan view of a pixel in a liquid crystal display in accordance with the first embodiment.
Figure 8:
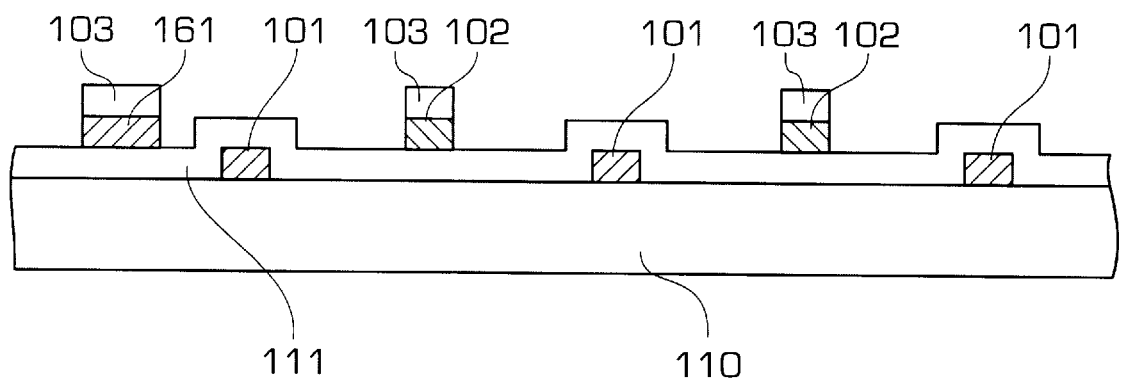
FIG. 8 is a cross-sectional view taken along the line VIII—VIII in FIG. 7.
Figure 9:
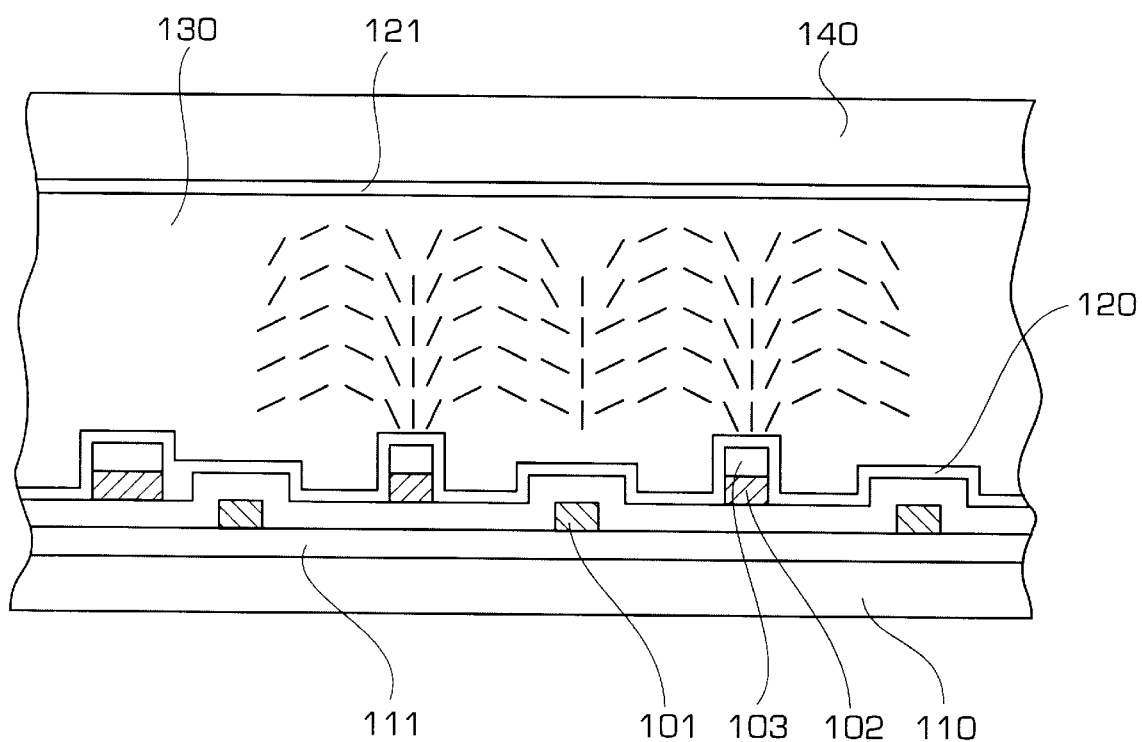
FIG. 9 is a cross-sectional view of the liquid crystal display in accordance with the first embodiment.

FIGS. 7 to 9 illustrate a liquid crystal display in accordance with the first embodiment. FIG. 7 is a top plan view of a pixel in the liquid crystal display, FIG. 8 is a cross-sectional view taken along the line VIII—VIII in FIG. 7, and FIG. 9 is a cross-sectional view of the liquid crystal display in accordance with the first embodiment. FIGS. 7 to 9 illustrate a pixel located at an intersection of an image signal line 161 and a scanning line 162.

As illustrated in FIGS. 7 to 9, the liquid crystal display in accordance with the first embodiment is comprised of a substrate 110, a first comb-shaped electrode 101 formed on the substrate 110 and composed of an electrically conductive layer made of metal and so on, an interlayer insulating layer 111 covering the first comb-shaped electrode 101 and the substrate 110 therewith, a second comb-shaped electrode 102 formed on the interlayer insulating layer 111 and composed of an electrically conductive layer made of metal and so on, a flexo-electric relieving layer 103 formed on the second comb-shaped electrode 102, an alignment layer 120 formed over the flexo-electric relieving layer 103 and the interlayer insulating film 111 for aligning liquid crystal, an opposing substrate 140 formed with a color layer (not illustrated), black matrix (not illustrated) and so on, an alignment layer 121 formed on a lower surface of the opposing substrate 140 for aligning liquid crystal, a liquid crystal layer 130 sandwiched between the alignment layers 120 and 121, and a thin film transistor (TFT) 163 for driving liquid crystal.

In operation of the liquid crystal display in accordance with the first embodiment, when the scanning line 162 is selected, a voltage on the image signal line 161 is transferred to the second comb-shaped electrode 102 through the thin film transistor 163. As a result, in-plane switching is performed between the second comb-shaped electrode 102 and the first comb-shaped electrode 101 to which a common voltage is applied.

The thin film transistor 163 is a so-called bottom gate type thin film transistor in which a scanning line or a gate electrode 162 is located below an image signal line 161.

The first comb-shaped electrode 101, the second comb-shaped electrode 102, the image signal line 161, and the scanning line 162 are all composed of an electrically conductive layer made of metal. The first comb-shaped layer 101 and the scanning line 162 are formed in a common electrically conductive layer. As illustrated in FIG. 8, the second comb-shaped electrode 102 and the image signal line 161 are formed in a common electrically conductive layer.

With reference to FIG. 7, the first comb-shaped electrode 101 is designed to have common bus sections at both the left and upper end and the right and upper end in FIG. 7 for connecting to first comb-shaped electrodes of adjacent pixels.

With reference to FIG. 8, an electrically conductive layer constituting the first comb-shaped electrode 101 is formed directly on the substrate 110. The substrate 110 is composed of glass, insulator, and so on. The substrate 110 may be formed at a surface thereof with an insulating film, in which case, the first comb-shaped electrode 101 is formed on the insulating film.

The interlayer insulating film 111 is formed covering the first combshaped electrode 101 and the substrate 110 therewith. On the interlayer insulating film 111 is formed an electrically conductive layer constituting the second comb-shaped electrode 102 and the image signal line 161.

The flexo-electric relieving layer 103 composed of an insulating film is formed on the second comb-shaped electrode 102 so that the flexo-electric relieving layer 103 just overlaps the second comb-shaped electrode 102. That is, the flexo-electric relieving layer 103 is almost coextensive with the second combshaped electrode 102.

In the first embodiment, the flexo-electric relieving layer 103 is designed to have a thickness equal to a thickness of the interlayer insulating film 111 formed on the first comb-shaped electrode 101.

Hereinbelow is explained a method of fabricating a liquid crystal display in accordance with the above-mentioned first embodiment.

First, a metal film composed of, for instance, chromium is deposited on the substrate 110 by means of a sputtering apparatus. The substrate 110 may be formed at a surface thereof with an insulating film, in which case, a metal film is deposited on the insulating film.

Then, the metal film is patterned into the first comb-shaped electrode 101 and the scanning line 162 in a photo-mask step comprising a photolithography step and a plasma-etching step.

Then, the interlayer insulating film 111 is deposited over the first comb-shaped electrode 111 and the substrate 110 by plasma-enhanced chemical vapor deposition (PCVD). The interlayer insulating film 111 is composed of, for instance, silicon oxide or silicon nitride.

Then, the thin film transistor 163 and ohmic layers necessary for an operation of the thin film transistor 163 are formed.

Then, an electrically conductive film composed of metal such as chromium, which will constitute the second comb-shaped electrode 102, and an insulating film composed of, for instance, silicon oxide or silicon nitride, which will constitute the flexo-electric relieving layer 103 are successively deposited by sputtering and plasma-enhanced chemical vapor deposition. Then, the thus formed electrically conductive film and insulating film are successively patterned into the second comb-shaped electrode 102 and the flexo-electric relieving layer 103, respectively, in a photo-mask step comprised of a photolithography step and an etching step.

The flexo-electric relieving layer 103 may be first formed by patterning only the insulating film in a photo-mask step and removing photoresist, and then, the second comb-shaped electrode 102 may be formed by etching the electrically conductive film with the already formed flexo-electric relieving layer 103 being used as a mask.

In accordance with the above-mentioned method, the flexo-electric relieving layer 103 is formed also on the image signal line 161, as illustrated in FIG. 8. Though the thus formed flexo-electric relieving layer 103 does not directly contribute to balancing flexo-electric effect, the flexo-electric relieving layer 103 provides an advantage that while other pixel rows are being scanned, voltage noises generated from the image signal line 161 are prevented from being exerted on the other pixel rows.

A cover insulating film (not illustrated) may be formed covering therewith upper and side surfaces of the flexo-electric relieving layer 103, a side surface of the second comb-shaped electrode 102, and a surface of the interlayer insulating film 111.

A cell illustrated in FIG. 9 is fabricated using a product having the above-mentioned structure. As illustrated in FIG. 9, the alignment film 120 is formed on an upper surface of the product having the above-mentioned structure. Similarly, the alignment film 121 is formed on a lower surface of the opposing substrate 140 having a color layer, black matrix and so on.

The liquid crystal layer 130 is sandwiched between the alignment films 120 and 121. Liquid crystal molecules in the liquid crystal layer 130 are in advance aligned in a direction almost perpendicular to a plane of FIG. 9 by means of the alignment films 120 and 121. By generating an electric field between the first comb-shaped electrode 101 and the second comb-shaped electrode 102, in-plane switching is performed in a horizontal direction in a plane of FIG. 9.

As illustrated in FIG. 9, a degree of spread in radial configuration of liquid crystal molecules in the vicinity of the alignment film 120 above the first comb-shaped electrode 101 is almost identical with the same above the second comb-shaped electrode 102. Accordingly, an intensity of flexo-electric effect generated above the first comb-shaped electrode 101 is equal to an intensity of flexo-electric effect generated above the second comb-shaped electrode 102. In other words, the flexo-electric effects generated above the first and second comb-shaped electrodes 101 and 102 are balanced. Hence, even if in-plane switching is over, an amount of electric charges residual on the first comb-shaped electrode 101 is almost equal to an amount of electric charges residual on the second comb-shaped electrode 102. As a result, a voltage based on a direct current is not residual, which ensures prevention of generation of after-image.

This is because the alignment film 120 and the interlayer insulating film 111 are sandwiched between the first comb-shaped electrode 101 and the liquid crystal layer 130, and the alignment film 120 and the flexo-electric relieving layer 103 are sandwiched between the second comb-shaped electrode 120 and the liquid crystal layer 130, which ensures that a dielectric distance of a dielectric layer formed between the first comb-shaped electrode 101 and the liquid crystal layer 130 is approximately equal to a dielectric distance of a dielectric layer formed between the second comb-shaped electrode 102 and the liquid crystal layer 130. As mentioned earlier, a dielectric distance is defined as a capacitance per a unit area, obtained when sandwiched between imaginary electrodes.

It is preferable that a ratio of a thickness to a dielectric constant in the interlayer insulating layer 111 is equal to the same in the flexo-electric relieving layer 103. Even if the ratio is not common between the interlayer insulating layer 111 and the flexo-electric relieving layer 103, existence of the flexo-electric relieving layer 103 ensures that the above-mentioned dielectric distances are approximately equal to each other with the result that flexo-electric effects found above the first and second comb-shaped electrodes 101 and 102 are balanced to some degree.

In accordance with the first embodiment, since the interlayer insulating film 111 electrically separates the first comb-shaped electrode 101 from the second comb-shaped electrode 102, even if the first or second comb-shaped electrode 101 or 102 includes patterning defects while a formation process thereof, it would be possible to avoid the first and second comb-shaped electrodes 101 and 102 from being short-circuited to each other.

In addition, since the second comb-shaped electrode 102 and the flexo-electric relieving layer 103 can be formed in a common photo-mask step, the liquid crystal display in accordance with the first embodiment can be fabricated without an increase in fabrication steps in comparison with a conventional liquid crystal display including no flexo-electric relieving layer 103.

Second Embodiment

Figure 10:
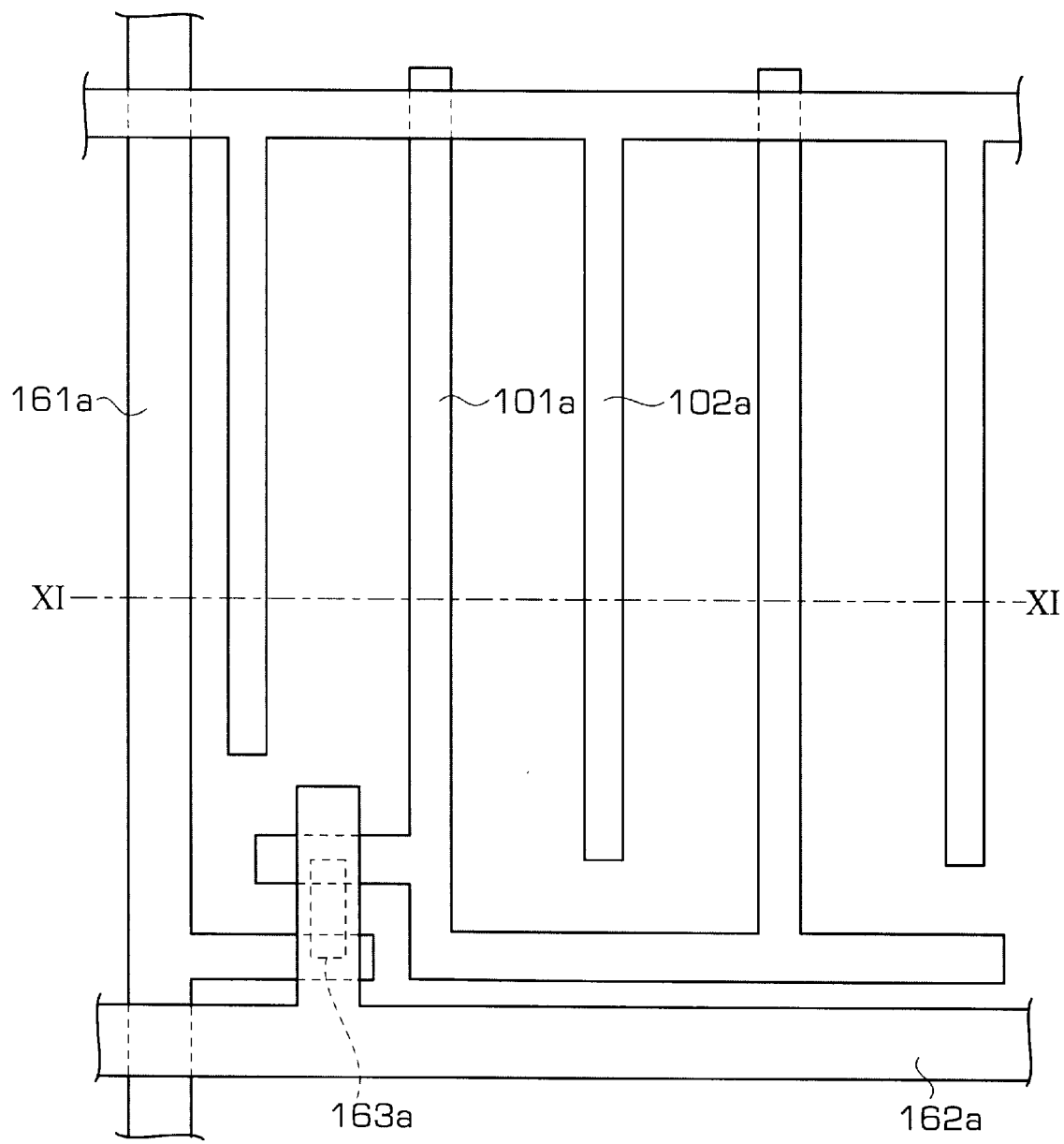
FIG. 10 is a top plan view of a pixel in a liquid crystal display in accordance with the second embodiment.
Figure 11:
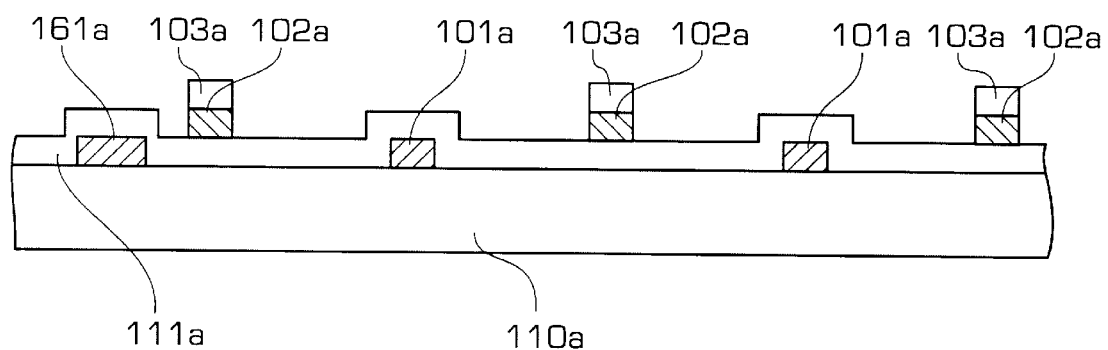
FIG. 11 is a cross-sectional view taken along the line X—X in FIG. 10.

FIGS. 10 and 11 illustrate a liquid crystal display in accordance with the second embodiment. FIG. 10 is a top plan view of a pixel in the liquid crystal display, and FIG. 11 is a cross-sectional view taken along the line XI—XI in FIG. 10. FIGS. 10 and 11 illustrate a pixel located at an intersection of an image signal line 161a and a scanning line 162a.

As illustrated in FIGS. 10 and 11, the liquid crystal display in accordance with the second embodiment is comprised of a substrate 110a, a first comb-shaped electrode 101a formed on the substrate 110a and composed of an electrically conductive layer made of metal, an image signal line 161a formed on the substrate 110a, an interlayer insulating layer 111a covering the first comb-shaped electrode 101a, the image signal line 161a, and the substrate 110a therewith, a second comb-shaped electrode 102a formed on the interlayer insulating layer 111a and composed of an electrically conductive layer made of metal, a flexo-electric relieving layer 103a formed on the second comb-shaped electrode 102a and composed of electrical insulator, an alignment layer (not illustrated) formed over the flexo-electric relieving layer 103a and the interlayer insulating film 111a for aligning liquid crystal, an opposing substrate (not illustrated), an alignment layer (not illustrated) formed on a lower surface of the opposing substrate for aligning liquid crystal, a liquid crystal layer (not illustrated) sandwiched between the alignment layers, and a thin film transistor (TFT) 163a for driving liquid crystal.

In operation of the liquid crystal display in accordance with the second embodiment, when the scanning line 162a is selected, a voltage on the image signal line 161a is transferred to the first comb-shaped electrode 101a through the thin film transistor 163a. As a result, in-plane switching is performed between the first comb-shaped electrode 101a and the second comb-shaped electrode 102a to which a common voltage is applied.

The thin film transistor 163a is a so-called top gate type thin film transistor in which a scanning line or a gate electrode 162a is located above an image signal line 161a.

The functions performed by the first comb-shaped electrode 101a located at a lower layer and the second comb-shaped electrode 102a located at an upper layer in the second embodiment are exchanged in comparison with the first embodiment with respect to an operation of a pixel. Whereas a common voltage is applied to the first comb-shaped electrode 101 and an image signal is transferred to the second comb-shaped electrode 102 in the first embodiment, a common voltage is applied to the second comb-shaped electrode 102a and an image signal is transferred to the first comb-shaped electrode 101a in the second embodiment.

However, the second embodiment provides the same advantageous effect as that of the first embodiment. That is, the flexo-electric effects found above the first and second comb-shaped electrodes 101a and 102a are balanced, similarly to the first embodiment.

Third Embodiment

Figure 12:
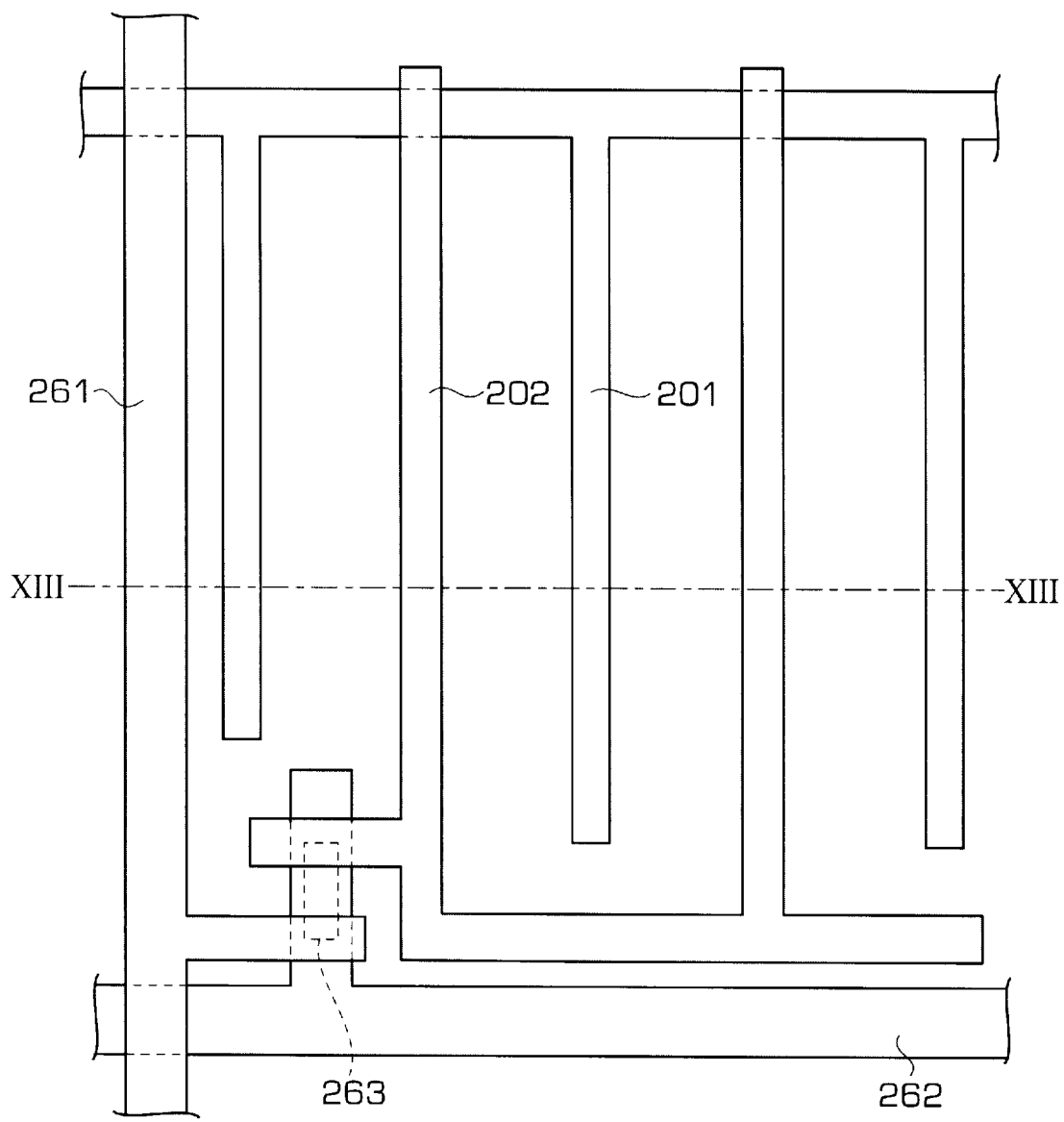
FIG. 12 is a top plan view of a pixel in a liquid crystal display in accordance with the third embodiment.
Figure 13:
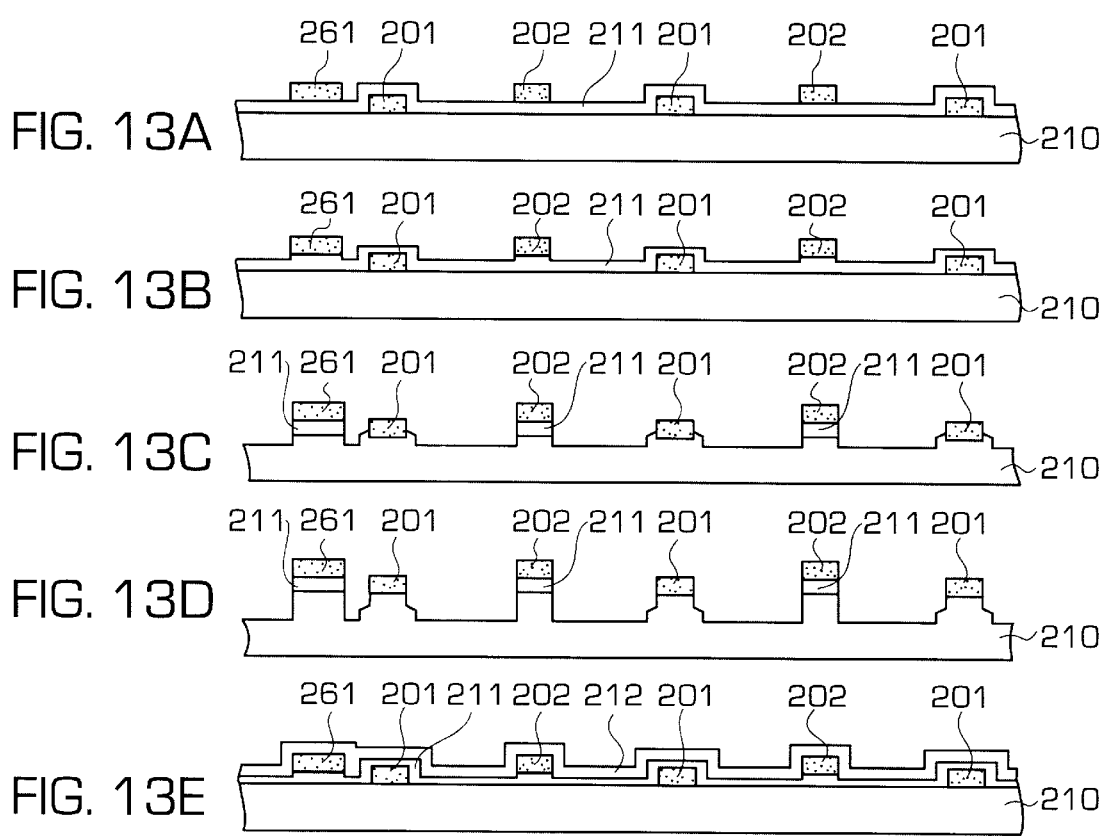
FIG. 13A is a cross-sectional view taken along the line XIII—XIII in FIG. 12, illustrating a step in a method of fabricating the liquid crystal display in accordance with the third embodiment.
FIGS. 13B to 13E are cross-sectional views taken along the line XIII—XIII in FIG. 12, illustrating possible structures of the liquid crystal display in accordance with the third embodiment.

FIGS. 12 and 13A to 13E illustrate a liquid crystal display in accordance with the third embodiment. FIG. 12 is a top plan view of a pixel in the liquid crystal display, FIG. 13A is a cross-sectional view taken along the line XIII—XIII in FIG. 12, illustrating a step in a method of fabricating the liquid crystal display in accordance with the third embodiment, and FIGS. 13B to 13E are cross-sectional views taken along the line XIII—XIII in FIG. 12, illustrating possible structures of the liquid crystal display in accordance with the third embodiment.

With reference to FIG. 12, when a scanning line 262 is selected, a voltage on an image signal line 261 is transferred to a second comb-shaped electrode 202 through a thin film transistor 263. As a result, in-plane switching is performed between the second comb-shaped electrode 202 and a first comb-shaped electrode 201 to which a common voltage is applied.

An electrically conductive layer constituting the first comb-shaped electrode 201 is formed on a substrate 210 composed of glass or insulator. As an alternative, the electrically conductive layer may be formed on the substrate 210 with an insulating film being sandwiched therebetween.

In fabrication of the liquid crystal display in accordance with the third embodiment, as illustrated in FIG. 13A, the first comb-shaped electrode 201 is first formed on the substrate 210. Then, an interlayer insulating film 211 is deposited over the first comb-shaped electrode 201 and the substrate 210. Then, the second comb-shaped electrode 202 is formed on the interlayer insulating film 211.

Thereafter, there can be obtained various structures as illustrated in FIGS. 13B to 13E by implementing fabrication steps as follows.

The structure illustrated in FIG. 13B is characterized in that the interlayer insulating film 211 is designed to have a first thickness of a portion of the interlayer insulating film 211 formed on the first comb-shaped electrode 201, and a second thickness of a portion of the interlayer insulating film 211 formed below the second comb-shaped electrode 202, and that the first thickness is smaller than the second thickness.

In order to obtain the structure illustrated in FIG. 13A, the following steps are implemented. First, a metal layer is deposited on either the substrate 210 or an insulating film formed on the substrate 210 by means of a sputtering apparatus. Then, the metal film is patterned into the first comb-shaped electrode 201 and the scanning line 262 in a photo-mask step.

Then, the interlayer insulating film 211 is deposited over the first comb-shaped electrode 201, the scanning line 262, and the substrate 210. After the thin film transistor 263 has been fabricated, a metal layer is deposited by means of a sputtering apparatus. Then, as illustrated in FIG. 13A, the metal layer is patterned into the second comb-shaped electrode 202 in a photo-mask step, and thereafter, the interlayer insulating film 211 is recessed in the same photo-mask step.

The interlayer insulating film 211 is recessed, for instance, by etching the interlayer insulating film 211 with the second comb-shaped electrode 202 being used as a mask, or etching the interlayer insulating film 211 with photoresist having been used for forming the second comb-shaped electrode 202, remaining on the second comb-shaped electrode 202.

A liquid crystal cell including the structure illustrated in FIG. 13B ensures that the flexo-electric effects found above the first and second comb-shaped electrodes 201 and 202 are balanced to greater degree than a liquid crystal cell in which the interlayer insulating film 211 does not have the first thickness on the first comb-shaped electrode 201, which is smaller than the second thickness below the second comb-shaped electrode 202.

A structure illustrated in FIG. 13C can be obtained by further scraping the interlayer insulating film 211 until an upper surface of the first comb-shaped electrode 201 appears.

A structure illustrated in FIG. 13D can be obtained by further scraping the interlayer insulating film 211 until upper and side surfaces of the first comb-shaped electrode 201 appear.

The structures illustrated in FIGS. 13C and 13D ensure that the flexo-electric effects found above the first and second comb-shaped electrodes 201 and 202 are balanced to greater degree than the structure illustrated in FIG. 13B. However, in the structures illustrated in FIGS. 13C and 13D, there are formed steps at or in the vicinity of the comb-shaped electrodes. It is considered that such steps exert harmful influence on alignment of liquid crystal, and hence, it would be necessary to determine optimal degree of scraping the interlayer insulating film 211.

A cover insulating film formed over the structure illustrated in FIG. 13A, 13B, 13C, or 13D would ensure that the flexo-electric effects found above the first and second comb-shaped electrodes are relieved, resulting in more stable balance in flexo-electric.

For instance, FIG. 13E illustrates a liquid crystal cell including the structure illustrated in FIG. 13A and a cover insulating film 212 deposited over the structure of FIG. 13A.

In the liquid crystal display in accordance with the third embodiment, the interlayer insulating film 211 electrically separates the first comb-shaped electrode 201 from the second comb-shaped electrode 202, ensuring that the first and second comb-shaped electrodes are not electrically short-circuited with each other, even if the first and second comb-shaped electrodes include patterning defects.

In addition, since it is not necessary to add a photo-mask step for scraping the interlayer insulating film 211, the number of fabrication steps is not increased.

Fourth Embodiment

Figure 14:
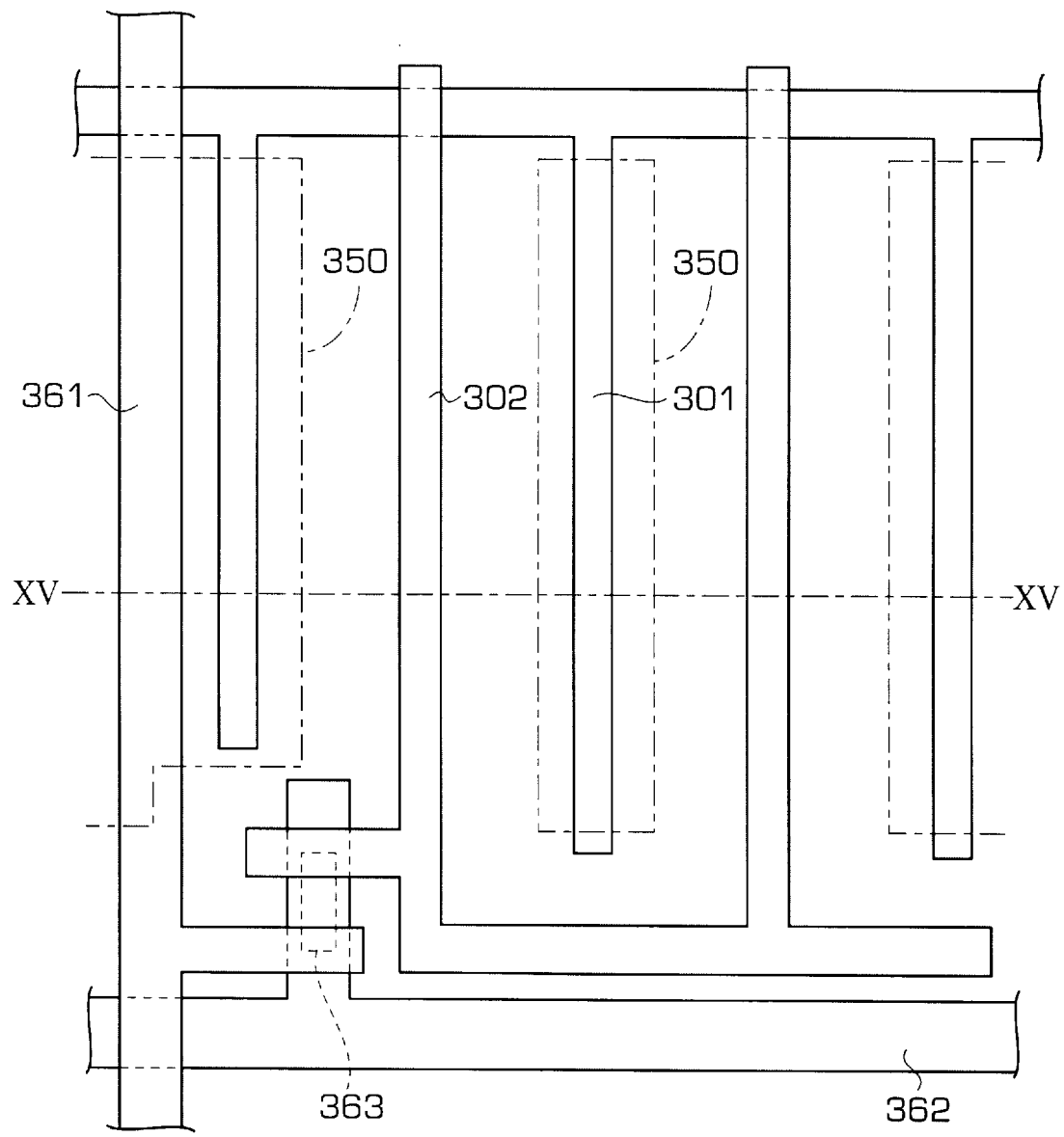
FIG. 14 is a top plan view of a pixel in a liquid crystal display in accordance with the fourth embodiment.
Figure 15:
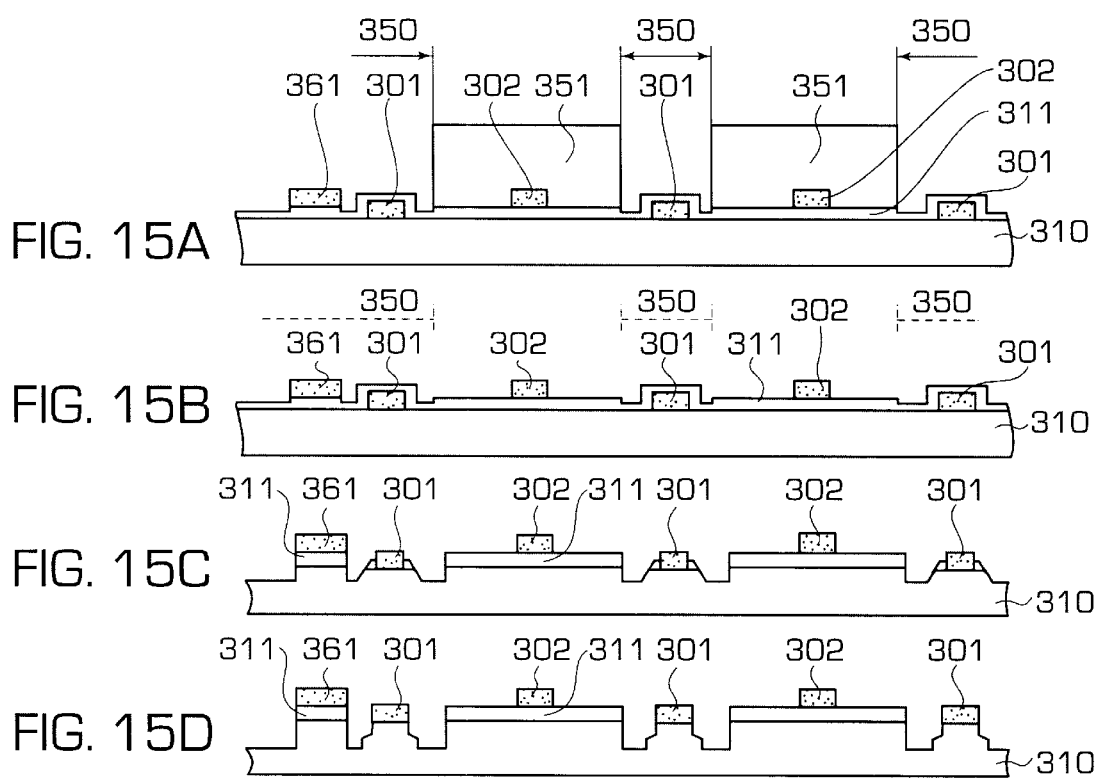
FIG. 15A is a cross-sectional view taken along the line XV—XV in FIG. 14, illustrating a step in a method of fabricating the liquid crystal display in accordance with the fourth embodiment.
FIGS. 15B to 15D are cross-sectional views taken along the line XV—XV in FIG. 14, illustrating possible structures of the liquid crystal display in accordance with the fourth embodiment.

FIGS. 14 and 15A to 15D illustrate a liquid crystal display in accordance with the fourth embodiment. FIG. 14 is a top plan view of a pixel in the liquid crystal display, FIG. 15A is a cross-sectional view taken along the line XV—XV in FIG. 14, illustrating a step in a method of fabricating the liquid crystal display in accordance with the fourth embodiment, and FIGS. 15B to 15D are cross-sectional views taken along the line XV—XV in FIG. 14, illustrating possible structures of the liquid crystal display in accordance with the fourth embodiment.

With reference to FIG. 14, when a scanning line 362 is selected, a voltage on an image signal line 361 is transferred to a second comb-shaped electrode 302 through a thin film transistor 363. As a result, in-plane switching is performed between the second comb-shaped electrode 302 and a first comb-shaped electrode 301 to which a common voltage is applied.

The fourth embodiment is characterized by that an interlayer insulating film is recessed in a photo-mask step other than a photo-mask step in which the second comb-shaped electrode 302 is formed.

Similarly to the first to third embodiments, since an interlayer insulating film 311 electrically separates the first comb-shaped electrode 301 from the second comb-shaped electrode 302, ensuring that the first and second comb-shaped electrodes are not electrically short-circuited with each other, even if the first and second comb-shaped electrodes include patterning defects.

In a process for fabricating a liquid crystal display in accordance with the fourth embodiment, as illustrated in FIG. 15A, the first comb-shaped electrode 301 is first formed on a substrate 310. Then, an interlayer insulating film 311 is deposited over the first comb-shaped electrode 301 and the substrate 310. Thereafter, the second comb-shaped electrode 302 is formed on the interlayer insulating film 311.

After formation of the second comb-shaped electrode 302, a photoresist layer 351 is formed and patterned on the interlayer insulating film 311 in a photo-mask step. Then, the interlayer insulating film 311 is etched in a recessed region 350 with the photoresist layer 351 being used as a mask.

A step for scraping the interlayer insulating film 311 by using the photoresist layer 351 as a mask may be carried out before the formation of the second comb-shaped electrode 302.

FIGS. 15B to 15D illustrate examples of the thus obtained structures. The interlayer insulating film 311 is recessed in the recessed region 350.

In the structures illustrated in FIGS. 15C and 15D, the interlayer insulating film 311 and the substrate 310 are recessed to greater degree than the structure illustrated in FIG. 15B. Hence, an advantage of balancing flexo-electric effect is enhanced in the structures illustrated in FIGS. 15C and 15D to greater degree than the structure illustrated in FIG. 15B.

In accordance with the fourth embodiment, a step formed below side surfaces of the second comb-shaped electrode 302 is gentler than a step formed below side surfaces of the second comb-shaped electrode 202 in the second embodiment. As a result, it is possible to reduce harmful influence on alignment of liquid crystal, caused by such a step.

In addition, since it is possible to distinguish the thin film transistor 363 from the recessed regions 350, the liquid crystal display in accordance with the fourth embodiment can operate without exerting an influence on a structure and performance of a thin film transistor unlike the second embodiment.

It should be noted that the interlayer insulating film 311 may be recessed in the recessed regions 350 in a step in which other parts or elements of the liquid crystal display are also patterned. For instance, the interlayer insulating film 311 may be recessed in a step in which a wiring layer is also formed, or a contact hole is also formed for electrically connecting electrodes to each other, ensuring a higher efficiency in a fabrication process.

Similarly to the above-mentioned embodiments, a cover insulating film such as the film 212 illustrating in FIG. 13E may be formed over the structure illustrated in FIG. 15B, 15C, or 15D.

Fifth Embodiment

Figure 16:
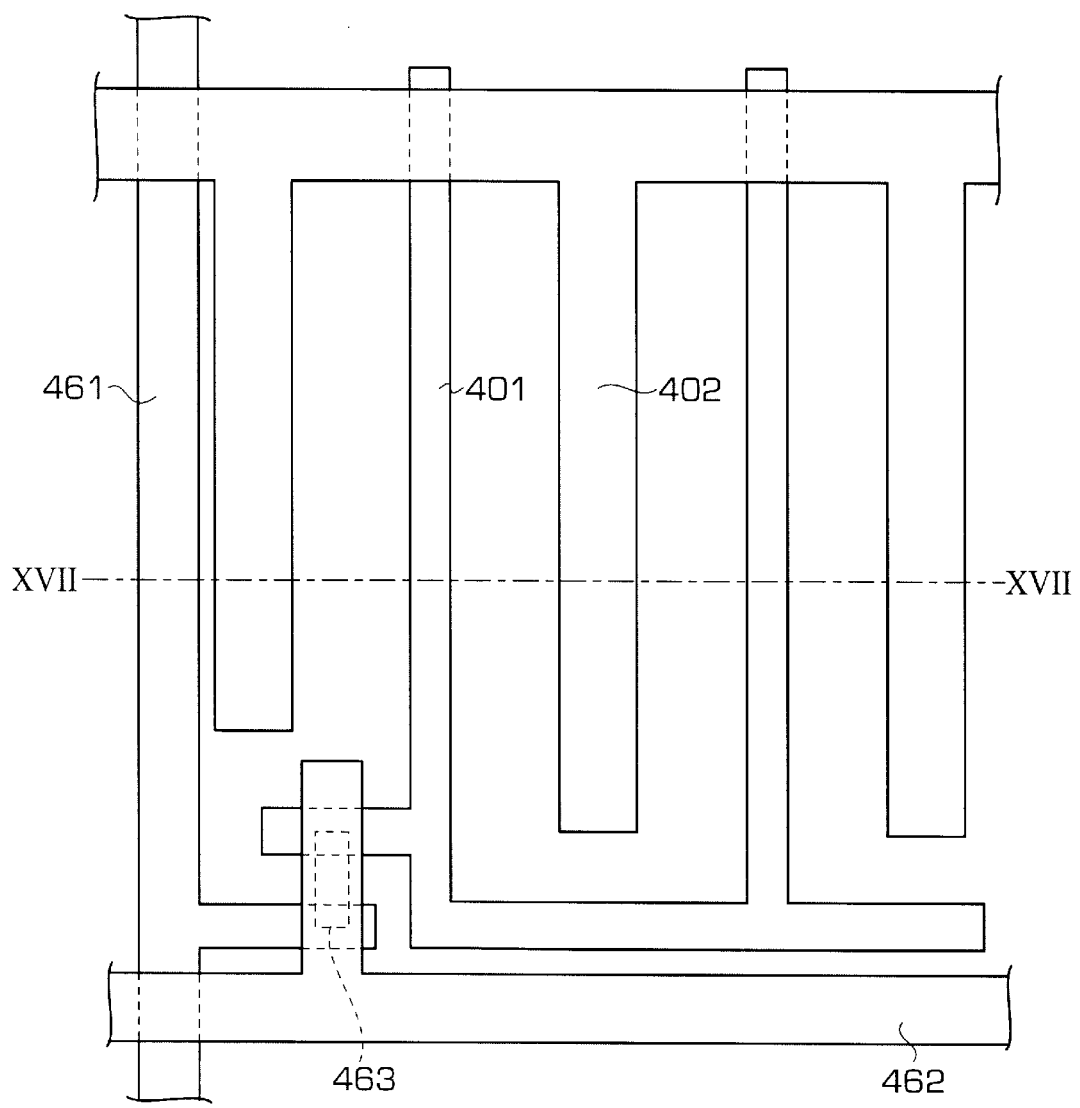
FIG. 16 is a top plan view of a pixel in a liquid crystal display in accordance with the fifth embodiment.
Figure 17:
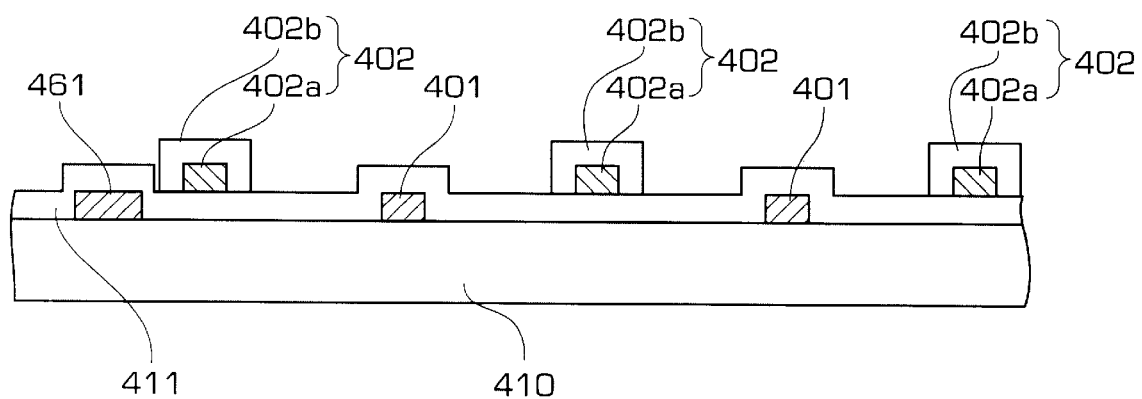
FIG. 17 is a cross-sectional view taken along the line XVII—XVII in FIG. 16.

FIGS. 16 and 17 illustrate a liquid crystal display in accordance with the fifth embodiment. FIG. 16 is a top plan view of a pixel in the liquid crystal display, and FIG. 17 is a cross-sectional view taken along the line XVII—XVII in FIG. 16.

With reference to FIG. 16, when a scanning line 462 is selected, a voltage on an image signal line 461 is transferred to a first comb-shaped electrode 401 through a thin film transistor 463. As a result, in-plane switching is performed between the first comb-shaped electrode 401 and a second comb-shaped electrode 402 to which a common voltage is applied.

In a process for fabricating a liquid crystal display in accordance with the fifth embodiment, as illustrated in FIG. 17, the first comb-shaped electrode 401 is first formed on a substrate 410. Then, an interlayer insulating film 411 is deposited over the first comb-shaped electrode 401 and the substrate 410. Thereafter, the second comb-shaped electrode 402 is formed on the interlayer insulating film 411.

In the fifth embodiment, the second comb-shaped electrode 402 is comprised of a comb-shaped electrode 402a composed of metal and an anodic oxide film 402b covering the comb-shaped electrode 402a therewith. The anodic oxide film 402b is formed by implementing anodic oxidation to a metal film after the metal film has been patterned into the second comb-shaped electrode 402.

The liquid crystal display in accordance with the fifth embodiment is similar in structure to the liquid crystal display in accordance with the second embodiment, but is different in that the comb-shaped electrode 402a is covered at upper and side surfaces thereof with the anodic oxide film 402b. This ensures that the flexo-electric effect is relieved also at a side surface of the second comb-shaped electrode 402.

Though not illustrated, the fifth embodiment may be combined to the third or fourth embodiment That is, in the combined embodiments, the second comb-shaped electrode 420a is covered at upper and side surfaces thereof with the anodic oxide film 420b, and the interlayer insulating film 411 is formed with the recessed region 350.

Similarly to the above-mentioned embodiments, a cover insulating film such as the film 212 illustrating in FIG. 13E may be formed over the structure illustrated in FIG. 17.

Sixth Embodiment

Figure 18A:
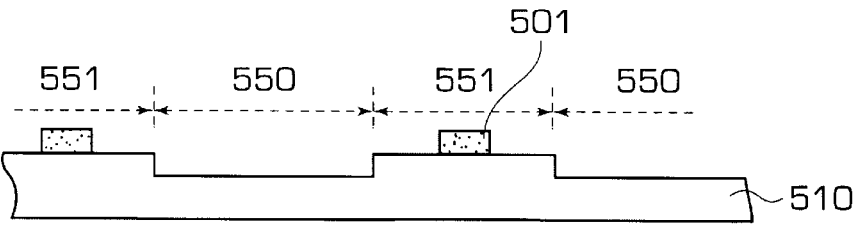
FIG. 18A is a cross-sectional view of a liquid crystal display in accordance with the sixth embodiment, illustrating a step in a method of fabricating the same.

FIGS. 18A to 18F illustrate a liquid crystal display in accordance with the sixth embodiment. FIG. 18A is a cross-sectional view of the liquid crystal display, illustrating a step in a method of fabricating the liquid crystal display in accordance with the sixth embodiment, and FIGS. 18B to 18F are cross-sectional views illustrating possible structures of the liquid crystal display in accordance with the sixth embodiment.

The sixth embodiment is comprised of a combination of a structure where a region in which a second comb-shaped electrode is to be formed is in advance recessed, and the structure of one of the first to fifth embodiments.

In a process of fabricating the liquid crystal display in accordance with the sixth embodiment, as illustrated in FIG. 18A, a substrate 510 or an insulating film formed on the substrate 510 is recessed to thereby form a recessed portion 550 in which a second comb-shaped electrode is to be formed.

Figure 18B:
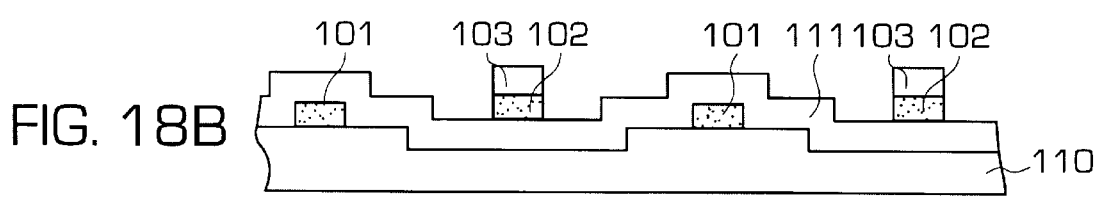
FIGS. 18B to 18F are cross-sectional views of the liquid crystal display in accordance with the sixth embodiment, illustrating possible structures of the same.

FIG. 18B illustrates a structure obtained by combining the sixth embodiment with the first or second embodiment. That is, the second combshaped electrode 102 and the flexo-electric relieving layer 103 formed on the second comb-shaped electrode 102 are formed on the interlayer insulating layer 111 in the recessed portion 550.

Figure 18C:
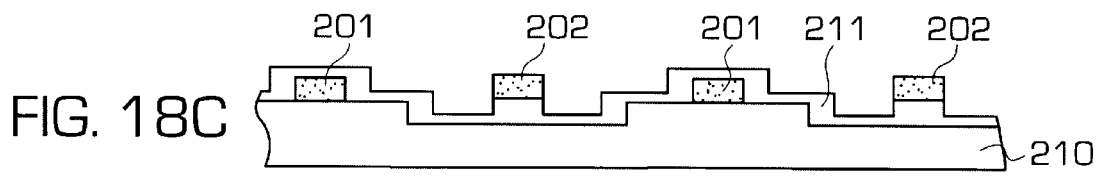

FIG. 18C illustrates a structure obtained by combining the sixth embodiment with the third embodiment. That is, the second comb-shaped electrode 202 is formed on the interlayer insulating film 211, and the interlayer insulating film 211 is designed to have a first thickness above the first comb-shaped electrode 201 and a second thickness below the second comb-shaped electrode 202. The first thickness is smaller than the second thickness.

Figure 18D:
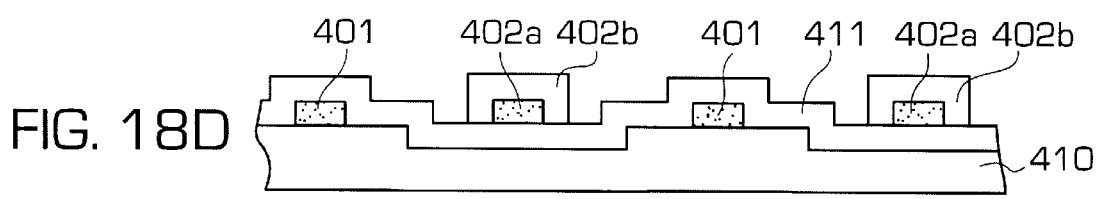

FIG. 18D illustrates a structure obtained by combining the sixth embodiment with the fifth embodiment. That is, the second comb-shaped electrode 402 is formed on the interlayer insulating film 411 in the recessed portion 550, and the second comb-shaped electrode 402 is comprised of a comb-shaped electrode 402a and an anodic oxide film 402b covering the comb-shaped electrode 402a therewith.

The liquid crystal display in accordance with the sixth embodiment is characterized in that the first comb-shaped electrode is designed to have an upper surface which is level with an upper surface of the second comb-shaped electrode. This ensures that the first and second comb-shaped electrodes are not short-circuited with each other, that the flexo-electric effects found above the first and second comb-shaped electrodes are balanced, and that there can be obtained a horizontal electric field ideal for in-plane switching.

Figure 18E:
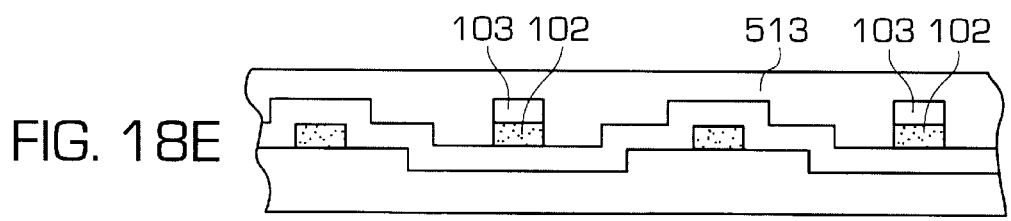

The structure where the first and second comb-shaped electrodes are of the same height ensures that the flexo-electric effects found above the first and second comb-shaped electrodes can be balanced, even if an insulating film 513 is formed over the structure illustrated in FIG. 18B for flattening an upper surface of a liquid crystal cell, as illustrated in FIG. 18E.

The insulating film 513 may be formed, for instance, by depositing silicon oxide or silicon nitride by means of a chemical vapor deposition apparatus, and polishing the silicon oxide or silicon nitride, or spin-applying a film composed of organic polymer such as polyimide, acrylate, or siloxane, and baking the film. The thus spin-applied film may double as an alignment film.

The insulating film 513 for flattening an upper surface of a liquid crystal cell eliminates sharp steps on a surface with which a liquid crystal layer makes contact, ensuring prevention of misalignment of liquid crystal. In addition, the insulating film 513 relieves the flexo-electric effects generated on the first and second comb-shaped electrodes, resulting in that enhancement of display performance and suppression of generation of after-image.

The above-mentioned method of forming the insulating film 513 can be applied to the above-mentioned first to fifth embodiments, if a first comb-shaped electrode is designed to have an upper surface level with an upper surface of a second comb-shaped electrode.

In the structure illustrated in FIG. 18E, the flexo-electric relieving layer 103 to be formed directly on the second comb-shaped electrode 102 may be omitted, if a capacitance per a unit area, of a dielectric layer formed between an upper surface of the first comb-shaped electrode and a liquid crystal layer is almost equal to a capacitance per a unit area, of a dielectric layer formed between an upper surface of the second comb-shaped electrode and a liquid crystal layer.

Figure 18F:
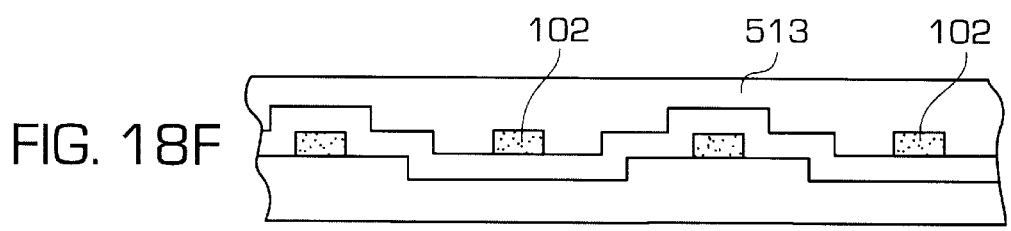

One of examples of such a structure is illustrated in FIG. 18F. By omitting the flexo-relieving layer 103, a process for fabricating the structure illustrated in FIG. 18F can be simplified relative to a process for fabricating the structure illustrated in FIG. 18E.

A step for forming the recessed portion 550 in the sixth embodiment may be in common with other step for forming other part of a liquid crystal display. For instance, a step for forming the recessed portion 550 may be in common with a step for forming a contact hole, resulting in a higher efficiency in a fabrication process.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-356527 filed on Dec. 25, 1997 including specification, claims, drawings and summary is incorporated herein by reference in its entirety.

What is claimed is:

1. A liquid crystal display comprising:

(a) a first substrate having an upper surface with at least one raised portion;

(b) a second substrate spaced away from and facing said first substrate;

(c) a liquid crystal layer sandwiched between said first and second substrates;

(d) a first electrode formed on said upper surface of the first substrate facing said liquid crystal layer, at least a part of said first electrode being formed on said raised portion;

(e) a second electrode formed on said first substrate at a surface facing said liquid crystal layer, and cooperating with said first electrode to form a pixel, said first and second electrodes generating an electric field therebetween to thereby implement in-plane switching; and (f) an interlayer insulating film formed at least below said second electrode, but not formed at least below said first electrode, a dielectric layer formed between at least a part of an upper surface of said first electrode and said liquid crystal layer being designed to have a capacitance per a unit area, almost equal to a capacitance per a unit area of a dielectric layer formed between at least a part of an upper surface of the second substrate of the first substrate.

2. The liquid crystal display as set forth in claim 1, further comprising an insulating film formed on said first substrate, a recessed portion being formed at a surface of said insulating film.

3. The liquid crystal display as set forth in claim 1, further comprising a flat insulating film covering said first and second electrodes.

4. The liquid crystal display as set forth in claim 3, wherein said flat insulating film is composed predominantly of organic polymer.

5. The liquid crystal display as set forth in claim 3, wherein said flat insulating film acts also as an alignment layer.

6. The liquid crystal display as set forth in claim 1, further comprising a flexo-electric relieving layer composed of electrically insulating material and formed on said second electrode.

7. The liquid crystal display as set forth in claim 6, wherein said flexo-electric relieving layer is almost coextensive with said second electrode.

8. The liquid crystal display as set forth in claim 6, wherein said flexo-electric relieving layer has the same thickness as a thickness of said interlayer insulating layer formed on said first electrode.

9. The liquid crystal display as set forth in claim 6, wherein said flexo-electric relieving layer has a ratio of a thickness to a dielectric constant, which ratio is almost equal to a ratio of a thickness to a dielectric constant, of said interlayer insulating layer.

* * * * *